United States Patent
Leonardon et al.

(10) Patent No.: US 10,533,423 B2
(45) Date of Patent: Jan. 14, 2020

(54) OPTIMIZED AERODYNAMIC PROFILE FOR A TURBINE BLADE, IN PARTICULAR FOR A ROTARY WHEEL OF A TURBINE

(71) Applicant: SAFRAN AIRCRAFT ENGINES, Paris (FR)

(72) Inventors: Vincent Nicolas Leonardon, Paris (FR); Pierre Hervé Fernand Marche, Saint Serotin (FR); Guillaume Jochen Scholl, Clamart (FR); Ludovic Pintat, Cesson (FR); Renaud Gabriel Constant Royan, Sucy en Brie (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 63 days.

(21) Appl. No.: 15/976,116

(22) Filed: May 10, 2018

(65) Prior Publication Data

US 2018/0328182 A1    Nov. 15, 2018

Related U.S. Application Data

(60) Provisional application No. 62/504,562, filed on May 11, 2017.

(51) Int. Cl.
*F01D 5/14* (2006.01)

(52) U.S. Cl.
CPC .......... *F01D 5/141* (2013.01); *F05D 2250/74* (2013.01)

(58) Field of Classification Search
CPC ............................. F01D 5/141; F05D 2250/74
See application file for complete search history.

(56) References Cited

U.S. PATENT DOCUMENTS

| | | | | |
|---|---|---|---|---|
| 10,280,755 B2 * | 5/2019 | Delabriere | ............. | F01D 5/141 |
| 10,287,887 B2 * | 5/2019 | Botrel | ...................... | F01D 5/141 |
| 10,287,888 B2 * | 5/2019 | Man | ....................... | F01D 5/141 |
| 10,329,914 B2 * | 6/2019 | Man | ....................... | F01D 5/141 |
| 10,385,697 B2 * | 8/2019 | Delabriere | ............... | F01D 5/14 |

* cited by examiner

*Primary Examiner* — David E Sosnowski
*Assistant Examiner* — Maranatha Boardman
(74) *Attorney, Agent, or Firm* — Bookoff McAndrews, PLLC

(57) ABSTRACT

When cold and in the non-coated state, the aerodynamic profile is substantially identical to a nominal profile determined by the Cartesian coordinates X, Y, Zadim given in Table 1, in which the coordinate Zadim is the quotient D/H where D is the distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

13 Claims, 2 Drawing Sheets

OPTIMIZED AERODYNAMIC PROFILE FOR A TURBINE BLADE, IN PARTICULAR FOR A ROTARY WHEEL OF A TURBINE

CROSS-REFERENCE TO RELATED APPLICATION

This patent application claims benefit under 35 U.S.C. § 119 to U.S. Provisional Patent Application No. 62/504,562, filed May 11, 2017, the entirety of which is incorporated herein by reference.

INTRODUCTION

The present disclosure relates to an aerodynamic profile for a turbine blade.

In particular, the disclosure relates to the aerodynamic profile of a blade of a rotary wheel of a gas turbine, and more particularly of a low pressure turbine of the type used in a turbojet of an aircraft.

The disclosure relates in particular to a blade of the rotary wheel of a turbine having a plurality of stages, preferably five stages.

Such a profile should enable the turbine to provide the desired efficiency, and in order to do that it must be such that the flow of air around the profile is sound, i.e. substantially such that it does not give rise to turbulence, which is harmful for overall efficiency.

It must be capable of being installed properly in the environment of the engine, and in particular, for the blade of a rotary wheel forming a portion of the rotor of the turbine, it must be capable of being fastened easily to the support disk of the rotary wheel, via the root of the blade, whereas its tip must be capable of carrying a top platform. Furthermore, this part must present a profile enabling it to be manufactured in a reliable and cost-effective manner by available manufacturing methods, such as casting, forging, machining, additive fabrication, or else weaving, without this list being limitative.

Furthermore, the profile of the blade must enable it to withstand the mechanical stresses to which the blade is subjected, by enabling those stresses to be spread over the entire blade in such a manner as to avoid premature wear thereof. This spreading must apply both in static mode and in dynamic mode. In particular, it must be such that the blade, given its resonant modes, can withstand the highest dynamic loading for good operation of the turbine.

An object of the disclosure is to propose an aerodynamic profile for a turbine blade that is optimized, and capable of satisfying those objectives.

This object is achieved by the fact that when cold and in a non-coated state, said profile is substantially identical to a nominal profile determined by the Cartesian coordinates X, Y, Zadim given in Table 1, in which the coordinate Zadim is the quotient D/H where D is the distance of the point P under consideration from a reference X, Y plane situated at the base of the nominal profile, and H is the height of said profile measured from said reference plane that is the intersection of the stacking axis of the blade and the axisymmetric surface of the hub, out to a second reference plane that is the intersection of said stacking axis with the axisymmetric surface of the casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the disclosure is defined in the non-coated state. Since turbine blades are subjected to high temperature gradients, it is common practice for them to be provided with a coating having thermal properties enabling them more easily to withstand such temperature variations. The profile is determined prior to installing such a coating.

It is stated above that the profile of the disclosure is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

It is also preferable for the X, Y coordinates of the aerodynamic profile to lie within a range of ±5% relative to the X, Y coordinates of the nominal profile.

In addition, the aerodynamic profile may be positioned rotated within ±10°, particularly within ±5°, more particularly within ±3°, with respect to the stacking axis.

These variations take account in particular of at least one of manufacturing tolerances of the profile, the setting of the profile to adapt to the flow coming from the turbine vanes situated upstream, and possible deformation occurring when mounting the blade and integrating the same in the rotary wheel. In particular, the profile is adapted so as to be optimized for the flow coming from the nozzle of the same stage of a turbine, when the blade of the disclosure belongs to a rotary wheel of a turbine.

For a blade of a rotary wheel, forming a portion of the rotor of a turbine, the profile serves to optimize the inter-blade flow, i.e. the flow between adjacent blades of the wheel, and thus transforms a maximum amount of the kinetic energy of the gaseous fluid into kinetic energy on the shaft of the turbine. In addition, it serves to orient the gaseous fluid correctly for the turbine vanes situated downstream, in particular belonging to the stationary nozzle of the next stage of the turbine, if such a next stage exists.

BRIEF DESCRIPTION OF THE DRAWINGS

The disclosure can be better understood and its advantages appear better on reading the following detailed description of an embodiment given by way of non-limiting example. The description refers to the accompanying drawings, in which.

DETAILED DESCRIPTION

Figure 1:
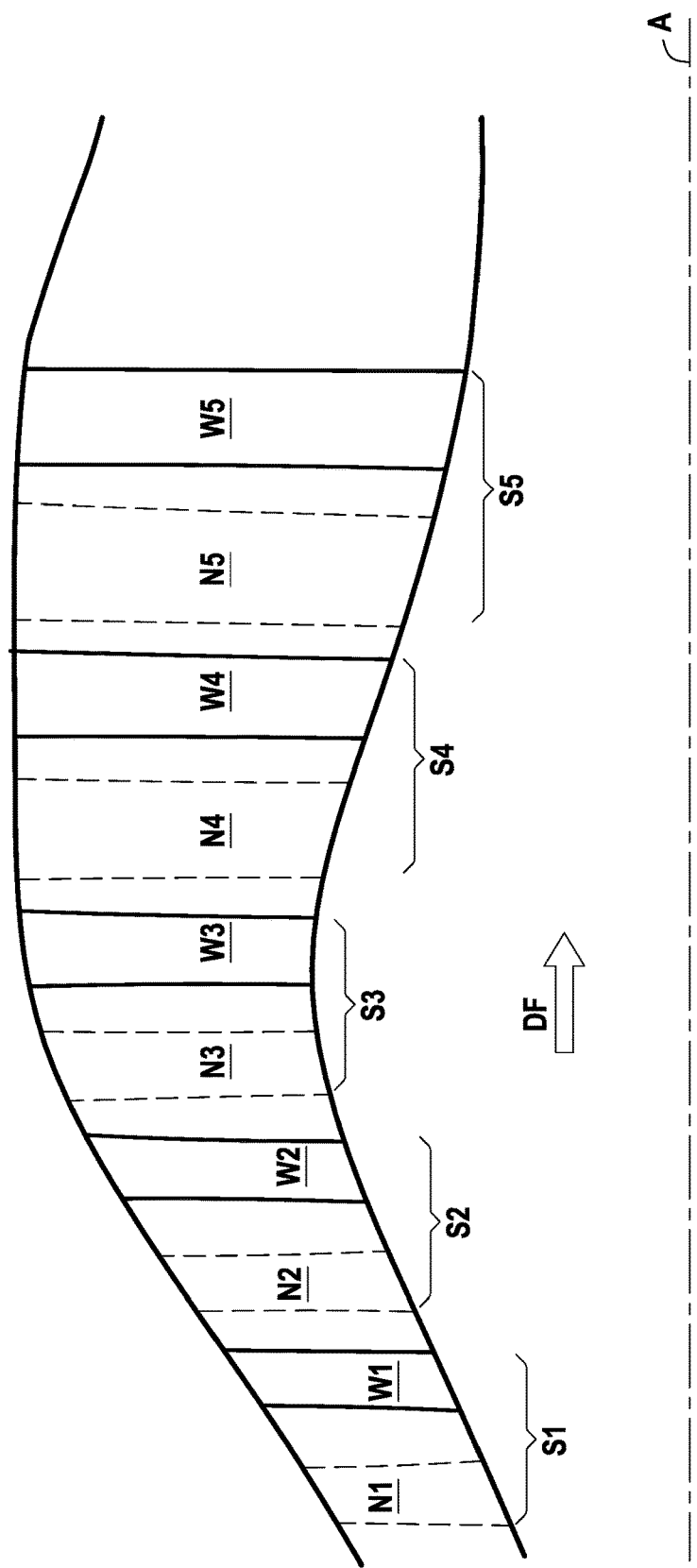
FIG. 1 is a fragmentary axial diagrammatic section view of a turbine including a blade of profile that corresponds to that of the disclosure.

The turbine shown in axial section in FIG. 1 comprises five stages referenced respectively S1 to S5. In the direction DF going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages S1 to S5 are given references N1 to N5 (these vanes are shown in dashed lines, for ease of representation), whereas the blades of rotary wheels of stages S1 to S5 are given respective references W1 to W5.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The disks forming parts of the wheels W1 to W5 are constrained to rotate together. The tips of the blades of the rotary wheels, formed at their radially-outer ends, may carry top platforms.

The disclosure relates in particular to a blade of one of the rotary wheels of the turbine that, as mentioned above, preferably comprises five stages as shown, without this number being limiting.

Figure 2:
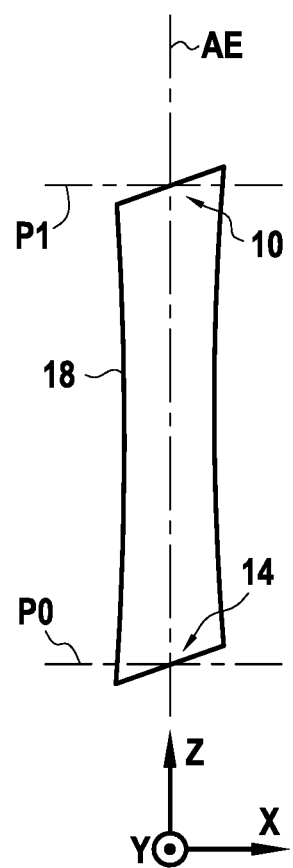
FIG. 2 shows a blade of the turbine.

The blade shown in FIG. 2 includes, at its radially-inner end, a blade root enabling it to be connected to a support disk forming the hub of a turbine wheel, and a platform 14 from which an aerodynamic profile 18 extends. At its tip, formed at its radially-outer end remote from the platform 14, the blade includes a top platform 10 that forms an outer casing carried by the various blades of the wheel.

By convention, the aerodynamic profile 18 is the entire portion of said blade that extends radially from the platform 14 to the top platform 10.

In FIG. 2, there can be seen a frame of reference comprising Cartesian coordinates X, Y, Z. The radial direction Z is the height direction of the blade, which extends radially from its root to its tip. This direction Z is perpendicular to the axial direction X which is the direction of the axis of rotation A of the turbine. The direction Y is perpendicular to the X, Z plane and is therefore tangential to the direction of rotation of the turbine.

The nominal profile from which the aerodynamic profile of the disclosure is determined is defined in following Table 1 of coordinates, in which the coordinates Zadim, measured along the axis Z is non-dimensional, whereas the dimensions X and Y, respectively measured along the axes X and Y, are expressed in millimeters.

TABLE 1

| X | Y | Zadim |
|---|---|---|
| −9.99299 | −1.69795 | −0.2 |
| −10.0234 | −1.65207 | −0.2 |
| −10.054 | −1.5782 | −0.2 |
| −10.0674 | −1.45513 | −0.2 |
| −10.0327 | −1.28707 | −0.2 |
| −9.93502 | −1.08412 | −0.2 |
| −9.77253 | −0.85522 | −0.2 |
| −9.54841 | −0.60125 | −0.2 |
| −9.26417 | −0.32235 | −0.2 |
| −8.92109 | −0.01836 | −0.2 |
| −8.51856 | 0.308282 | −0.2 |
| −8.05548 | 0.653417 | −0.2 |
| −7.53105 | 1.011958 | −0.2 |
| −6.94494 | 1.377737 | −0.2 |
| −6.29621 | 1.741669 | −0.2 |
| −5.58393 | 2.091683 | −0.2 |
| −4.80729 | 2.411166 | −0.2 |
| −3.96713 | 2.6792 | −0.2 |
| −3.06739 | 2.868417 | −0.2 |
| −2.11776 | 2.945014 | −0.2 |
| −1.14077 | 2.879766 | −0.2 |
| −0.16439 | 2.652602 | −0.2 |

TABLE 1-continued

| X | Y | Zadim |
|---|---|---|
| 0.778789 | 2.264093 | −0.2 |
| 1.661413 | 1.729525 | −0.2 |
| 2.472912 | 1.082444 | −0.2 |
| 3.212801 | 0.354133 | −0.2 |
| 3.881874 | −0.43255 | −0.2 |
| 4.484663 | −1.2573 | −0.2 |
| 5.028473 | −2.10233 | −0.2 |
| 5.520016 | −2.9533 | −0.2 |
| 5.965408 | −3.79839 | −0.2 |
| 6.369079 | −4.62828 | −0.2 |
| 6.735538 | −5.43462 | −0.2 |
| 7.068882 | −6.21016 | −0.2 |
| 7.371763 | −6.94905 | −0.2 |
| 7.646705 | −7.64617 | −0.2 |
| 7.89606 | −8.29714 | −0.2 |
| 8.121682 | −8.89839 | −0.2 |
| 8.324529 | −9.44736 | −0.2 |
| 8.505683 | −9.94212 | −0.2 |
| 8.665614 | −10.3817 | −0.2 |
| 8.805097 | −10.7656 | −0.2 |
| 8.924563 | −11.0946 | −0.2 |
| 9.024757 | −11.37 | −0.2 |
| 9.106426 | −11.5939 | −0.2 |
| 9.170516 | −11.7694 | −0.2 |
| 9.192475 | −11.9072 | −0.2 |
| 9.154927 | −11.9973 | −0.2 |
| 9.112117 | −12.0414 | −0.2 |
| 9.071264 | −12.0651 | −0.2 |
| 9.034575 | −12.0766 | −0.2 |
| 8.984603 | −12.08 | −0.2 |
| 8.908327 | −12.0589 | −0.2 |
| 8.828542 | −11.9771 | −0.2 |
| 8.766545 | −11.8382 | −0.2 |
| 8.687389 | −11.661 | −0.2 |
| 8.589386 | −11.4434 | −0.2 |
| 8.471251 | −11.184 | −0.2 |
| 8.331916 | −10.8819 | −0.2 |
| 8.170879 | −10.5367 | −0.2 |
| 7.986462 | −10.1492 | −0.2 |
| 7.77919 | −9.72002 | −0.2 |
| 7.547933 | −9.2509 | −0.2 |
| 7.289673 | −8.74528 | −0.2 |
| 6.998923 | −8.20872 | −0.2 |
| 6.665656 | −7.65026 | −0.2 |
| 6.277981 | −7.0826 | −0.2 |
| 5.828346 | −6.51863 | −0.2 |
| 5.313822 | −5.97073 | −0.2 |
| 4.734468 | −5.45125 | −0.2 |
| 4.093559 | −4.97168 | −0.2 |
| 3.396104 | −4.54359 | −0.2 |
| 2.650149 | −4.17549 | −0.2 |
| 1.866091 | −3.87117 | −0.2 |
| 1.071905 | −3.62663 | −0.2 |
| 0.322533 | −3.43663 | −0.2 |
| −0.44792 | −3.26568 | −0.2 |
| −1.15663 | −3.11752 | −0.2 |
| −1.74003 | −2.99536 | −0.2 |
| −2.53485 | −2.82362 | −0.2 |
| −3.25743 | −2.66056 | −0.2 |
| −3.84753 | −2.52443 | −0.2 |
| −4.48216 | −2.37915 | −0.2 |
| −5.11256 | −2.24218 | −0.2 |
| −5.79367 | −2.10989 | −0.2 |
| −6.40184 | −2.01306 | −0.2 |
| −6.91715 | −1.95207 | −0.2 |
| −7.44172 | −1.9134 | −0.2 |
| −7.91158 | −1.90031 | −0.2 |
| −8.33347 | −1.90578 | −0.2 |
| −8.70624 | −1.92311 | −0.2 |
| −9.02983 | −1.9443 | −0.2 |
| −9.30537 | −1.95943 | −0.2 |
| −9.53343 | −1.94678 | −0.2 |
| −9.71182 | −1.90204 | −0.2 |
| −9.83584 | −1.8368 | −0.2 |
| −9.91601 | −1.77624 | −0.2 |
| −9.77897 | −1.3663 | −0.1 |
| −9.81172 | −1.32077 | −0.1 |
| −9.84604 | −1.2469 | −0.1 |

TABLE 1-continued

| X | Y | Zadim |
|---|---|---|
| −9.86569 | −1.12246 | −0.1 |
| −9.83994 | −0.94928 | −0.1 |
| −9.75322 | −0.73727 | −0.1 |
| −9.60296 | −0.49405 | −0.1 |
| −9.39158 | −0.2214 | −0.1 |
| −9.12011 | 0.079936 | −0.1 |
| −8.78957 | 0.409647 | −0.1 |
| −8.39873 | 0.764644 | −0.1 |
| −7.94637 | 1.140741 | −0.1 |
| −7.431 | 1.532024 | −0.1 |
| −6.85131 | 1.930989 | −0.1 |
| −6.20574 | 2.32755 | −0.1 |
| −5.49276 | 2.708438 | −0.1 |
| −4.71057 | 3.054608 | −0.1 |
| −3.8595 | 3.341962 | −0.1 |
| −2.944 | 3.539712 | −0.1 |
| −1.97674 | 3.612321 | −0.1 |
| −0.98225 | 3.529642 | −0.1 |
| 0.006789 | 3.274314 | −0.1 |
| 0.954216 | 2.847806 | −0.1 |
| 1.834636 | 2.273961 | −0.1 |
| 2.637151 | 1.585917 | −0.1 |
| 3.362166 | 0.8162 | −0.1 |
| 4.013704 | −0.00957 | −0.1 |
| 4.597249 | −0.87104 | −0.1 |
| 5.120829 | −1.75051 | −0.1 |
| 5.591874 | −2.63368 | −0.1 |
| 6.017229 | −3.50876 | −0.1 |
| 6.402085 | −4.36631 | −0.1 |
| 6.751265 | −5.19809 | −0.1 |
| 7.069066 | −5.99698 | −0.1 |
| 7.358253 | −6.75718 | −0.1 |
| 7.620851 | −7.47385 | −0.1 |
| 7.859953 | −8.14238 | −0.1 |
| 8.076944 | −8.75941 | −0.1 |
| 8.272552 | −9.32249 | −0.1 |
| 8.447865 | −9.82968 | −0.1 |
| 8.603062 | −10.2801 | −0.1 |
| 8.73875 | −10.6734 | −0.1 |
| 8.855275 | −11.0104 | −0.1 |
| 8.953191 | −11.2923 | −0.1 |
| 9.033137 | −11.5214 | −0.1 |
| 9.095999 | −11.7011 | −0.1 |
| 9.118696 | −11.8413 | −0.1 |
| 9.080123 | −11.933 | −0.1 |
| 9.035851 | −11.9773 | −0.1 |
| 8.993748 | −12.0005 | −0.1 |
| 8.95694 | −12.0111 | −0.1 |
| 8.907098 | −12.0136 | −0.1 |
| 8.831711 | −11.9919 | −0.1 |
| 8.752481 | −11.909 | −0.1 |
| 8.692009 | −11.7703 | −0.1 |
| 8.615955 | −11.5926 | −0.1 |
| 8.52215 | −11.3742 | −0.1 |
| 8.40957 | −11.1136 | −0.1 |
| 8.277414 | −10.8097 | −0.1 |
| 8.125051 | −10.4623 | −0.1 |
| 7.951974 | −10.0715 | −0.1 |
| 7.757561 | −9.63844 | −0.1 |
| 7.541873 | −9.1643 | −0.1 |
| 7.304434 | −8.65112 | −0.1 |
| 7.040605 | −8.10352 | −0.1 |
| 6.743741 | −7.52784 | −0.1 |
| 6.406745 | −6.93186 | −0.1 |
| 6.023692 | −6.32413 | −0.1 |
| 5.589276 | −5.7144 | −0.1 |
| 5.099495 | −5.11362 | −0.1 |
| 4.5515 | −4.53458 | −0.1 |
| 3.944114 | −3.99218 | −0.1 |
| 3.279571 | −3.50231 | −0.1 |
| 2.565337 | −3.07804 | −0.1 |
| 1.809332 | −2.72418 | −0.1 |
| 1.019591 | −2.43797 | −0.1 |
| 0.25723 | −2.22142 | −0.1 |
| −0.5697 | −2.03244 | −0.1 |
| −1.35642 | −1.88007 | −0.1 |
| −2.10009 | −1.74788 | −0.1 |
| −2.86047 | −1.61377 | −0.1 |
| −3.58601 | −1.48284 | −0.1 |
| −4.28739 | −1.36012 | −0.1 |
| −4.95591 | −1.25421 | −0.1 |
| −5.58899 | −1.1758 | −0.1 |
| −6.18524 | −1.13193 | −0.1 |
| −6.74177 | −1.12506 | −0.1 |
| −7.25397 | −1.15397 | −0.1 |
| −7.71791 | −1.21197 | −0.1 |
| −8.13089 | −1.28967 | −0.1 |
| −8.49229 | −1.37658 | −0.1 |
| −8.80558 | −1.45502 | −0.1 |
| −9.07309 | −1.51734 | −0.1 |
| −9.29874 | −1.54848 | −0.1 |
| −9.48053 | −1.53743 | −0.1 |
| −9.61353 | −1.49264 | −0.1 |
| −9.69901 | −1.44078 | −0.1 |
| −9.42406 | −1.90264 | 0 |
| −9.46309 | −1.86087 | 0 |
| −9.50776 | −1.79081 | 0 |
| −9.54539 | −1.66816 | 0 |
| −9.54552 | −1.48947 | 0 |
| −9.49119 | −1.26255 | 0 |
| −9.37837 | −0.99388 | 0 |
| −9.20834 | −0.68605 | 0 |
| −8.98148 | −0.3404 | 0 |
| −8.69736 | 0.041359 | 0 |
| −8.35557 | 0.457095 | 0 |
| −7.95349 | 0.901972 | 0 |
| −7.48881 | 1.37007 | 0 |
| −6.95858 | 1.853214 | 0 |
| −6.35901 | 2.340065 | 0 |
| −5.68581 | 2.815343 | 0 |
| −4.93486 | 3.258631 | 0 |
| −4.10367 | 3.64312 | 0 |
| −3.19433 | 3.935056 | 0 |
| −2.21868 | 4.096421 | 0 |
| −1.20035 | 4.090244 | 0 |
| −0.17597 | 3.898524 | 0 |
| 0.815463 | 3.524906 | 0 |
| 1.746433 | 2.994528 | 0 |
| 2.603569 | 2.341389 | 0 |
| 3.385022 | 1.598934 | 0 |
| 4.094973 | 0.79536 | 0 |
| 4.738232 | −0.04803 | 0 |
| 5.321922 | −0.91282 | 0 |
| 5.85418 | −1.78333 | 0 |
| 6.340331 | −2.64788 | 0 |
| 6.785028 | −3.49662 | 0 |
| 7.192915 | −4.32082 | 0 |
| 7.568093 | −5.11291 | 0 |
| 7.913002 | −5.8669 | 0 |
| 8.229271 | −6.5778 | 0 |
| 8.519223 | −7.24096 | 0 |
| 8.783955 | −7.85292 | 0 |
| 9.02375 | −8.41126 | 0 |
| 9.239524 | −8.91395 | 0 |
| 9.431096 | −9.36021 | 0 |
| 9.598932 | −9.74976 | 0 |
| 9.743267 | −10.0833 | 0 |
| 9.864628 | −10.3622 | 0 |
| 9.963772 | −10.5889 | 0 |
| 10.04179 | −10.7666 | 0 |
| 10.07814 | −10.9068 | 0 |
| 10.04721 | −11.0034 | 0 |
| 10.00564 | −11.0517 | 0 |
| 9.9645 | −11.0784 | 0 |
| 9.926711 | −11.092 | 0 |
| 9.874716 | −11.0975 | 0 |
| 9.79477 | −11.078 | 0 |
| 9.70951 | −10.9937 | 0 |
| 9.635574 | −10.8533 | 0 |
| 9.542067 | −10.6735 | 0 |
| 9.427117 | −10.4526 | 0 |
| 9.289769 | −10.1886 | 0 |
| 9.129324 | −9.88053 | 0 |
| 8.945338 | −9.52799 | 0 |
| 8.737549 | −9.13117 | 0 |
| 8.505633 | −8.69096 | 0 |

TABLE 1-continued

| X | Y | Zadim |
|---|---|---|
| 8.249427 | −8.20883 | 0 |
| 7.969201 | −7.68662 | 0 |
| 7.663558 | −7.12761 | 0 |
| 7.32738 | −6.53777 | 0 |
| 6.955581 | −5.92388 | 0 |
| 6.544334 | −5.29306 | 0 |
| 6.091143 | −4.65255 | 0 |
| 5.594855 | −4.0096 | 0 |
| 5.05418 | −3.37258 | 0 |
| 4.46775 | −2.75122 | 0 |
| 3.834729 | −2.1564 | 0 |
| 3.154874 | −1.60064 | 0 |
| 2.428962 | −1.09833 | 0 |
| 1.658606 | −0.66781 | 0 |
| 0.850751 | −0.326 | 0 |
| 0.019215 | −0.08093 | 0 |
| −0.81975 | 0.067907 | 0 |
| −1.65044 | 0.132577 | 0 |
| −2.46069 | 0.135785 | 0 |
| −3.24202 | 0.090828 | 0 |
| −3.98738 | 0.004749 | 0 |
| −4.69088 | −0.11826 | 0 |
| −5.3467 | −0.27696 | 0 |
| −5.94992 | −0.46676 | 0 |
| −6.49757 | −0.67908 | 0 |
| −6.98868 | −0.90381 | 0 |
| −7.42443 | −1.1301 | 0 |
| −7.8075 | −1.34785 | 0 |
| −8.14173 | −1.54813 | 0 |
| −8.43123 | −1.72358 | 0 |
| −8.68172 | −1.86543 | 0 |
| −8.89951 | −1.96404 | 0 |
| −9.08468 | −2.00978 | 0 |
| −9.23116 | −2.0032 | 0 |
| −9.33034 | −1.96834 | 0 |
| −9.23648 | −1.49732 | 0.1 |
| −9.27761 | −1.45611 | 0.1 |
| −9.32569 | −1.38647 | 0.1 |
| −9.36949 | −1.26345 | 0.1 |
| −9.37898 | −1.08174 | 0.1 |
| −9.33683 | −0.84789 | 0.1 |
| −9.23815 | −0.56811 | 0.1 |
| −9.08319 | −0.2453 | 0.1 |
| −8.87169 | 0.118708 | 0.1 |
| −8.60256 | 0.521672 | 0.1 |
| −8.2749 | 0.960974 | 0.1 |
| −7.88618 | 1.431897 | 0.1 |
| −7.43285 | 1.927485 | 0.1 |
| −6.91094 | 2.438569 | 0.1 |
| −6.31567 | 2.952589 | 0.1 |
| −5.64212 | 3.453088 | 0.1 |
| −4.88542 | 3.91777 | 0.1 |
| −4.04261 | 4.316978 | 0.1 |
| −3.11638 | 4.613483 | 0.1 |
| −2.12136 | 4.767457 | 0.1 |
| −1.08465 | 4.742552 | 0.1 |
| −0.04675 | 4.521681 | 0.1 |
| 0.951305 | 4.112104 | 0.1 |
| 1.881971 | 3.542679 | 0.1 |
| 2.732214 | 2.848943 | 0.1 |
| 3.500692 | 2.06519 | 0.1 |
| 4.194345 | 1.221946 | 0.1 |
| 4.819663 | 0.341261 | 0.1 |
| 5.384721 | −0.55843 | 0.1 |
| 5.897392 | −1.46212 | 0.1 |
| 6.364799 | −2.35744 | 0.1 |
| 6.791676 | −3.2348 | 0.1 |
| 7.183089 | −4.08548 | 0.1 |
| 7.543062 | −4.90213 | 0.1 |
| 7.8744 | −5.67867 | 0.1 |
| 8.179125 | −6.41002 | 0.1 |
| 8.459005 | −7.09181 | 0.1 |
| 8.715201 | −7.72057 | 0.1 |
| 8.947752 | −8.29396 | 0.1 |
| 9.157624 | −8.80995 | 0.1 |
| 9.344442 | −9.26781 | 0.1 |
| 9.508445 | −9.66739 | 0.1 |
| 9.649762 | −10.0094 | 0.1 |
| 9.768769 | −10.2954 | 0.1 |
| 9.866117 | −10.5278 | 0.1 |
| 9.94281 | −10.7098 | 0.1 |
| 9.979682 | −10.8526 | 0.1 |
| 9.947735 | −10.9508 | 0.1 |
| 9.904608 | −10.9994 | 0.1 |
| 9.862158 | −11.0256 | 0.1 |
| 9.821201 | −11.039 | 0.1 |
| 9.765197 | −11.0425 | 0.1 |
| 9.680815 | −11.0154 | 0.1 |
| 9.597637 | −10.9182 | 0.1 |
| 9.521247 | −10.7658 | 0.1 |
| 9.424154 | −10.5711 | 0.1 |
| 9.30514 | −10.3317 | 0.1 |
| 9.163396 | −10.0454 | 0.1 |
| 8.998393 | −9.71103 | 0.1 |
| 8.809929 | −9.328 | 0.1 |
| 8.597941 | −8.89638 | 0.1 |
| 8.362229 | −8.41706 | 0.1 |
| 8.10308 | −7.89136 | 0.1 |
| 7.820193 | −7.32149 | 0.1 |
| 7.512871 | −6.71048 | 0.1 |
| 7.178635 | −6.06282 | 0.1 |
| 6.81463 | −5.38381 | 0.1 |
| 6.419213 | −4.67877 | 0.1 |
| 5.99047 | −3.95379 | 0.1 |
| 5.52624 | −3.21579 | 0.1 |
| 5.023431 | −2.47308 | 0.1 |
| 4.478908 | −1.73509 | 0.1 |
| 3.889883 | −1.0123 | 0.1 |
| 3.25277 | −0.31763 | 0.1 |
| 2.564116 | 0.333329 | 0.1 |
| 1.822126 | 0.922436 | 0.1 |
| 1.02712 | 1.427655 | 0.1 |
| 0.184772 | 1.824568 | 0.1 |
| −0.69116 | 2.089499 | 0.1 |
| −1.57778 | 2.212425 | 0.1 |
| −2.44577 | 2.195514 | 0.1 |
| −3.273 | 2.055938 | 0.1 |
| −4.0426 | 1.819735 | 0.1 |
| −4.7464 | 1.516062 | 0.1 |
| −5.38326 | 1.170949 | 0.1 |
| −5.95458 | 0.80423 | 0.1 |
| −6.46314 | 0.431574 | 0.1 |
| −6.91329 | 0.066188 | 0.1 |
| −7.30982 | −0.28113 | 0.1 |
| −7.65879 | −0.60054 | 0.1 |
| −7.96548 | −0.88501 | 0.1 |
| −8.23437 | −1.1295 | 0.1 |
| −8.47141 | −1.32793 | 0.1 |
| −8.68145 | −1.47456 | 0.1 |
| −8.86709 | −1.5621 | 0.1 |
| −9.02214 | −1.58628 | 0.1 |
| −9.13254 | −1.5628 | 0.1 |
| −9.09473 | −0.54796 | 0.2 |
| −9.13566 | −0.50548 | 0.2 |
| −9.1832 | −0.43409 | 0.2 |
| −9.22606 | −0.3089 | 0.2 |
| −9.23442 | −0.12475 | 0.2 |
| −9.19106 | 0.112136 | 0.2 |
| −9.0906 | 0.395453 | 0.2 |
| −8.93238 | 0.721977 | 0.2 |
| −8.71562 | 1.089401 | 0.2 |
| −8.43895 | 1.495069 | 0.2 |
| −8.09966 | 1.934697 | 0.2 |
| −7.69625 | 2.403865 | 0.2 |
| −7.22505 | 2.894974 | 0.2 |
| −6.68168 | 3.397605 | 0.2 |
| −6.06138 | 3.897949 | 0.2 |
| −5.35959 | 4.378069 | 0.2 |
| −4.57214 | 4.813461 | 0.2 |
| −3.69784 | 5.171988 | 0.2 |
| −2.74309 | 5.414846 | 0.2 |
| −1.72688 | 5.500311 | 0.2 |
| −0.68186 | 5.398029 | 0.2 |
| 0.34897 | 5.095361 | 0.2 |
| 1.324867 | 4.603413 | 0.2 |
| 2.219615 | 3.954044 | 0.2 |

TABLE 1-continued

| X | Y | Zadim |
|---|---|---|
| 3.02273 | 3.184847 | 0.2 |
| 3.738538 | 2.333438 | 0.2 |
| 4.375322 | 1.428571 | 0.2 |
| 4.941695 | 0.491982 | 0.2 |
| 5.44777 | −0.45825 | 0.2 |
| 5.90178 | −1.40816 | 0.2 |
| 6.311651 | −2.34595 | 0.2 |
| 6.683393 | −3.26211 | 0.2 |
| 7.022701 | −4.14825 | 0.2 |
| 7.333377 | −4.99757 | 0.2 |
| 7.618718 | −5.80411 | 0.2 |
| 7.881344 | −6.56279 | 0.2 |
| 8.12276 | −7.26951 | 0.2 |
| 8.344131 | −7.92092 | 0.2 |
| 8.545493 | −8.5147 | 0.2 |
| 8.727753 | −9.04893 | 0.2 |
| 8.89047 | −9.52287 | 0.2 |
| 9.033724 | −9.93644 | 0.2 |
| 9.157496 | −10.2904 | 0.2 |
| 9.261964 | −10.5864 | 0.2 |
| 9.347568 | −10.8269 | 0.2 |
| 9.415102 | −11.0154 | 0.2 |
| 9.445936 | −11.1616 | 0.2 |
| 9.408816 | −11.2593 | 0.2 |
| 9.362373 | −11.306 | 0.2 |
| 9.31784 | −11.33 | 0.2 |
| 9.274121 | −11.3412 | 0.2 |
| 9.215327 | −11.3405 | 0.2 |
| 9.129657 | −11.3041 | 0.2 |
| 9.052816 | −11.1948 | 0.2 |
| 8.981926 | −11.0308 | 0.2 |
| 8.891833 | −10.8215 | 0.2 |
| 8.781746 | −10.5638 | 0.2 |
| 8.651091 | −10.2556 | 0.2 |
| 8.499583 | −9.89548 | 0.2 |
| 8.32726 | −9.48269 | 0.2 |
| 8.134212 | −9.01726 | 0.2 |
| 7.92047 | −8.49999 | 0.2 |
| 7.686586 | −7.93212 | 0.2 |
| 7.431815 | −7.31606 | 0.2 |
| 7.156139 | −6.65453 | 0.2 |
| 6.858728 | −5.95112 | 0.2 |
| 6.538208 | −5.21019 | 0.2 |
| 6.192321 | −4.43699 | 0.2 |
| 5.819517 | −3.63702 | 0.2 |
| 5.415748 | −2.81749 | 0.2 |
| 4.977046 | −1.98634 | 0.2 |
| 4.499167 | −1.15254 | 0.2 |
| 3.976276 | −0.3272 | 0.2 |
| 3.401358 | 0.475933 | 0.2 |
| 2.76903 | 1.241489 | 0.2 |
| 2.072555 | 1.948824 | 0.2 |
| 1.307733 | 2.572607 | 0.2 |
| 0.476208 | 3.083255 | 0.2 |
| −0.41077 | 3.44863 | 0.2 |
| −1.3277 | 3.64651 | 0.2 |
| −2.23805 | 3.671786 | 0.2 |
| −3.10754 | 3.540756 | 0.2 |
| −3.91066 | 3.28272 | 0.2 |
| −4.6357 | 2.93703 | 0.2 |
| −5.28138 | 2.537847 | 0.2 |
| −5.85248 | 2.113604 | 0.2 |
| −6.35572 | 1.685396 | 0.2 |
| −6.79787 | 1.268763 | 0.2 |
| −7.18549 | 0.875346 | 0.2 |
| −7.52527 | 0.514404 | 0.2 |
| −7.8242 | 0.193834 | 0.2 |
| −8.08735 | −0.08142 | 0.2 |
| −8.31964 | −0.30713 | 0.2 |
| −8.52623 | −0.47832 | 0.2 |
| −8.71013 | −0.58926 | 0.2 |
| −8.869 | −0.63312 | 0.2 |
| −8.98583 | −0.61661 | 0.2 |
| −8.90843 | 0.025639 | 0.3 |
| −8.95108 | 0.067108 | 0.3 |
| −9.00121 | 0.137573 | 0.3 |
| −9.04849 | 0.262366 | 0.3 |
| −9.0635 | 0.447611 | 0.3 |
| −9.02891 | 0.687975 | 0.3 |
| −8.93861 | 0.977303 | 0.3 |
| −8.79091 | 1.312023 | 0.3 |
| −8.58434 | 1.689324 | 0.3 |
| −8.31693 | 2.106016 | 0.3 |
| −7.98652 | 2.558104 | 0.3 |
| −7.58914 | 3.039089 | 0.3 |
| −7.12076 | 3.540666 | 0.3 |
| −6.57748 | 4.052392 | 0.3 |
| −5.95419 | 4.559577 | 0.3 |
| −5.24592 | 5.042804 | 0.3 |
| −4.44848 | 5.475742 | 0.3 |
| −3.56196 | 5.825151 | 0.3 |
| −2.59433 | 6.050768 | 0.3 |
| −1.56707 | 6.111441 | 0.3 |
| −0.51631 | 5.975375 | 0.3 |
| 0.512494 | 5.634476 | 0.3 |
| 1.479702 | 5.105575 | 0.3 |
| 2.362407 | 4.424469 | 0.3 |
| 3.154656 | 3.630857 | 0.3 |
| 3.859424 | 2.75829 | 0.3 |
| 4.485668 | 1.834908 | 0.3 |
| 5.04348 | 0.882592 | 0.3 |
| 5.543202 | −0.08112 | 0.3 |
| 5.992438 | −1.04299 | 0.3 |
| 6.398639 | −1.99167 | 0.3 |
| 6.768394 | −2.9175 | 0.3 |
| 7.107327 | −3.81224 | 0.3 |
| 7.418517 | −4.6694 | 0.3 |
| 7.705242 | −5.48301 | 0.3 |
| 7.970219 | −6.24795 | 0.3 |
| 8.214336 | −6.96032 | 0.3 |
| 8.438902 | −7.6167 | 0.3 |
| 8.643696 | −8.21483 | 0.3 |
| 8.82944 | −8.75283 | 0.3 |
| 8.995535 | −9.23002 | 0.3 |
| 9.141928 | −9.64636 | 0.3 |
| 9.268538 | −10.0026 | 0.3 |
| 9.375471 | −10.3005 | 0.3 |
| 9.463155 | −10.5426 | 0.3 |
| 9.532369 | −10.7322 | 0.3 |
| 9.565125 | −10.8793 | 0.3 |
| 9.528409 | −10.978 | 0.3 |
| 9.481668 | −11.0252 | 0.3 |
| 9.436782 | −11.0494 | 0.3 |
| 9.392253 | −11.0608 | 0.3 |
| 9.332376 | −11.06 | 0.3 |
| 9.245275 | −11.0224 | 0.3 |
| 9.167953 | −10.9106 | 0.3 |
| 9.094973 | −10.7438 | 0.3 |
| 9.002372 | −10.531 | 0.3 |
| 8.889431 | −10.2689 | 0.3 |
| 8.755659 | −9.95533 | 0.3 |
| 8.600894 | −9.58874 | 0.3 |
| 8.425325 | −9.16834 | 0.3 |
| 8.229288 | −8.69407 | 0.3 |
| 8.012986 | −8.16665 | 0.3 |
| 7.777178 | −7.58729 | 0.3 |
| 7.521146 | −6.95843 | 0.3 |
| 7.24512 | −6.2827 | 0.3 |
| 6.948818 | −5.56352 | 0.3 |
| 6.631037 | −4.8052 | 0.3 |
| 6.289462 | −4.013 | 0.3 |
| 5.922795 | −3.19228 | 0.3 |
| 5.526541 | −2.35037 | 0.3 |
| 5.096856 | −1.49501 | 0.3 |
| 4.629886 | −0.63477 | 0.3 |
| 4.118545 | 0.21893 | 0.3 |
| 3.556622 | 1.053398 | 0.3 |
| 2.936547 | 1.852433 | 0.3 |
| 2.251414 | 2.596132 | 0.3 |
| 1.495294 | 3.258797 | 0.3 |
| 0.666965 | 3.808298 | 0.3 |
| −0.22321 | 4.210817 | 0.3 |
| −1.14998 | 4.439044 | 0.3 |
| −2.07559 | 4.488199 | 0.3 |
| −2.96305 | 4.371444 | 0.3 |
| −3.78405 | 4.118832 | 0.3 |

TABLE 1-continued

| X | Y | Zadim |
|---|---|---|
| −4.52375 | 3.769351 | 0.3 |
| −5.17978 | 3.360289 | 0.3 |
| −5.75625 | 2.921373 | 0.3 |
| −6.25882 | 2.474005 | 0.3 |
| −6.69479 | 2.035089 | 0.3 |
| −7.07267 | 1.61838 | 0.3 |
| −7.40011 | 1.234083 | 0.3 |
| −7.68442 | 0.889905 | 0.3 |
| −7.93317 | 0.592307 | 0.3 |
| −8.15193 | 0.345387 | 0.3 |
| −8.34548 | 0.152464 | 0.3 |
| −8.51925 | 0.019506 | 0.3 |
| −8.67437 | −0.04435 | 0.3 |
| −8.7945 | −0.03895 | 0.3 |
| −8.79136 | 0.372949 | 0.4 |
| −8.83692 | 0.41154 | 0.4 |
| −8.89168 | 0.478875 | 0.4 |
| −8.94689 | 0.600909 | 0.4 |
| −8.97378 | 0.785495 | 0.4 |
| −8.95478 | 1.028487 | 0.4 |
| −8.88303 | 1.324111 | 0.4 |
| −8.75574 | 1.668547 | 0.4 |
| −8.57058 | 2.058559 | 0.4 |
| −8.32489 | 2.490515 | 0.4 |
| −8.01568 | 2.959819 | 0.4 |
| −7.63853 | 3.459685 | 0.4 |
| −7.18864 | 3.981225 | 0.4 |
| −6.66076 | 4.512732 | 0.4 |
| −6.0491 | 5.038468 | 0.4 |
| −5.34858 | 5.538437 | 0.4 |
| −4.55438 | 5.983993 | 0.4 |
| −3.66707 | 6.340076 | 0.4 |
| −2.69614 | 6.566206 | 0.4 |
| −1.66534 | 6.621924 | 0.4 |
| −0.61266 | 6.480003 | 0.4 |
| 0.418536 | 6.136287 | 0.4 |
| 1.391966 | 5.610857 | 0.4 |
| 2.285117 | 4.936582 | 0.4 |
| 3.093159 | 4.153056 | 0.4 |
| 3.819567 | 3.292975 | 0.4 |
| 4.472782 | 2.383389 | 0.4 |
| 5.062593 | 1.445728 | 0.4 |
| 5.597089 | 0.496252 | 0.4 |
| 6.083741 | −0.45164 | 0.4 |
| 6.528629 | −1.38701 | 0.4 |
| 6.938036 | −2.30003 | 0.4 |
| 7.316858 | −3.18246 | 0.4 |
| 7.667268 | −4.02797 | 0.4 |
| 7.99216 | −4.83054 | 0.4 |
| 8.293945 | −5.58492 | 0.4 |
| 8.572931 | −6.28736 | 0.4 |
| 8.830109 | −6.93441 | 0.4 |
| 9.064961 | −7.52389 | 0.4 |
| 9.277911 | −8.05397 | 0.4 |
| 9.468303 | −8.52401 | 0.4 |
| 9.63601 | −8.93398 | 0.4 |
| 9.78093 | −9.28472 | 0.4 |
| 9.90321 | −9.57792 | 0.4 |
| 10.00337 | −9.81609 | 0.4 |
| 10.08237 | −10.0026 | 0.4 |
| 10.12293 | −10.1484 | 0.4 |
| 10.09083 | −10.249 | 0.4 |
| 10.04614 | −10.2985 | 0.4 |
| 10.00227 | −10.3249 | 0.4 |
| 9.957881 | −10.3385 | 0.4 |
| 9.89742 | −10.3405 | 0.4 |
| 9.807711 | −10.3067 | 0.4 |
| 9.724705 | −10.1973 | 0.4 |
| 9.642864 | −10.0327 | 0.4 |
| 9.538981 | −9.82251 | 0.4 |
| 9.412245 | −9.56357 | 0.4 |
| 9.262122 | −9.25362 | 0.4 |
| 9.088457 | −8.8911 | 0.4 |
| 8.891506 | −8.47514 | 0.4 |
| 8.671588 | −8.00569 | 0.4 |
| 8.429158 | −7.48336 | 0.4 |
| 8.165206 | −6.90925 | 0.4 |
| 7.879282 | −6.28579 | 0.4 |
| 7.572041 | −5.6155 | 0.4 |
| 7.243235 | −4.90186 | 0.4 |
| 6.892041 | −4.14918 | 0.4 |
| 6.516788 | −3.36262 | 0.4 |
| 6.116632 | −2.5475 | 0.4 |
| 5.687339 | −1.71129 | 0.4 |
| 5.226511 | −0.8612 | 0.4 |
| 4.72964 | −0.00631 | 0.4 |
| 4.191092 | 0.842512 | 0.4 |
| 3.604096 | 1.672084 | 0.4 |
| 2.963718 | 2.468131 | 0.4 |
| 2.262396 | 3.210732 | 0.4 |
| 1.494 | 3.874761 | 0.4 |
| 0.657278 | 4.429865 | 0.4 |
| −0.23962 | 4.84229 | 0.4 |
| −1.17441 | 5.080501 | 0.4 |
| −2.10974 | 5.134905 | 0.4 |
| −3.00652 | 5.016361 | 0.4 |
| −3.83472 | 4.757753 | 0.4 |
| −4.57784 | 4.396629 | 0.4 |
| −5.23202 | 3.970353 | 0.4 |
| −5.80117 | 3.510169 | 0.4 |
| −6.29281 | 3.040647 | 0.4 |
| −6.71474 | 2.579437 | 0.4 |
| −7.07571 | 2.140555 | 0.4 |
| −7.38415 | 1.734357 | 0.4 |
| −7.6476 | 1.368343 | 0.4 |
| −7.87457 | 1.04898 | 0.4 |
| −8.07123 | 0.779961 | 0.4 |
| −8.24519 | 0.565586 | 0.4 |
| −8.40333 | 0.411082 | 0.4 |
| −8.55013 | 0.326641 | 0.4 |
| −8.67134 | 0.317586 | 0.4 |
| −8.72075 | 1.408974 | 0.5 |
| −8.76627 | 1.447561 | 0.5 |
| −8.82049 | 1.515254 | 0.5 |
| −8.87412 | 1.637901 | 0.5 |
| −8.89844 | 1.822748 | 0.5 |
| −8.87601 | 2.065299 | 0.5 |
| −8.79989 | 2.359645 | 0.5 |
| −8.66669 | 2.70161 | 0.5 |
| −8.47387 | 3.087606 | 0.5 |
| −8.21753 | 3.512988 | 0.5 |
| −7.89368 | 3.971911 | 0.5 |
| −7.49805 | 4.456837 | 0.5 |
| −7.02624 | 4.958118 | 0.5 |
| −6.47313 | 5.462714 | 0.5 |
| −5.83383 | 5.953746 | 0.5 |
| −5.10364 | 6.408123 | 0.5 |
| −4.28041 | 6.795977 | 0.5 |
| −3.36856 | 7.082222 | 0.5 |
| −2.38274 | 7.227386 | 0.5 |
| −1.35174 | 7.196491 | 0.5 |
| −0.31416 | 6.970521 | 0.5 |
| 0.687838 | 6.549116 | 0.5 |
| 1.622619 | 5.958267 | 0.5 |
| 2.475973 | 5.235261 | 0.5 |
| 3.245877 | 4.415105 | 0.5 |
| 3.937812 | 3.527874 | 0.5 |
| 4.560433 | 2.597861 | 0.5 |
| 5.12332 | 1.644573 | 0.5 |
| 5.635434 | 0.683559 | 0.5 |
| 6.102221 | −0.27358 | 0.5 |
| 6.529859 | −1.21629 | 0.5 |
| 6.924574 | −2.13512 | 0.5 |
| 7.290734 | −3.02227 | 0.5 |
| 7.630095 | −3.8717 | 0.5 |
| 7.945451 | −4.67751 | 0.5 |
| 8.238998 | −5.43464 | 0.5 |
| 8.510792 | −6.13941 | 0.5 |
| 8.76164 | −6.7885 | 0.5 |
| 8.990989 | −7.37975 | 0.5 |
| 9.199133 | −7.91137 | 0.5 |
| 9.385388 | −8.38275 | 0.5 |
| 9.549504 | −8.79389 | 0.5 |
| 9.691357 | −9.14564 | 0.5 |
| 9.811053 | −9.4397 | 0.5 |
| 9.909105 | −9.67859 | 0.5 |

TABLE 1-continued

| X | Y | Zadim |
|---|---|---|
| 9.98644 | −9.8657 | 0.5 |
| 10.02539 | −10.0118 | 0.5 |
| 9.991652 | −10.1118 | 0.5 |
| 9.946309 | −10.1607 | 0.5 |
| 9.902135 | −10.1864 | 0.5 |
| 9.85737 | −10.1997 | 0.5 |
| 9.796592 | −10.201 | 0.5 |
| 9.706712 | −10.1663 | 0.5 |
| 9.624507 | −10.0555 | 0.5 |
| 9.544002 | −9.88918 | 0.5 |
| 9.441846 | −9.67683 | 0.5 |
| 9.317243 | −9.41527 | 0.5 |
| 9.169695 | −9.10217 | 0.5 |
| 8.999077 | −8.736 | 0.5 |
| 8.80569 | −8.31584 | 0.5 |
| 8.590005 | −7.84158 | 0.5 |
| 8.352488 | −7.31385 | 0.5 |
| 8.094251 | −6.7337 | 0.5 |
| 7.814864 | −6.10354 | 0.5 |
| 7.515172 | −5.42581 | 0.5 |
| 7.195102 | −4.70393 | 0.5 |
| 6.854025 | −3.94206 | 0.5 |
| 6.490498 | −3.14524 | 0.5 |
| 6.103466 | −2.3188 | 0.5 |
| 5.690198 | −1.46935 | 0.5 |
| 5.247304 | −0.60435 | 0.5 |
| 4.771017 | 0.267797 | 0.5 |
| 4.255946 | 1.136908 | 0.5 |
| 3.695484 | 1.990705 | 0.5 |
| 3.084761 | 2.816085 | 0.5 |
| 2.416193 | 3.595053 | 0.5 |
| 1.682791 | 4.304931 | 0.5 |
| 0.87964 | 4.915992 | 0.5 |
| 0.010728 | 5.394274 | 0.5 |
| −0.90544 | 5.709069 | 0.5 |
| −1.83595 | 5.845025 | 0.5 |
| −2.74332 | 5.808712 | 0.5 |
| −3.59472 | 5.621834 | 0.5 |
| −4.36783 | 5.318697 | 0.5 |
| −5.05437 | 4.938585 | 0.5 |
| −5.65461 | 4.513559 | 0.5 |
| −6.17351 | 4.069119 | 0.5 |
| −6.61811 | 3.625315 | 0.5 |
| −6.99621 | 3.197333 | 0.5 |
| −7.31593 | 2.796734 | 0.5 |
| −7.5858 | 2.432641 | 0.5 |
| −7.81492 | 2.112413 | 0.5 |
| −8.00959 | 1.839875 | 0.5 |
| −8.1807 | 1.62144 | 0.5 |
| −8.3344 | 1.460931 | 0.5 |
| −8.47798 | 1.369635 | 0.5 |
| −8.59934 | 1.355372 | 0.5 |
| −8.71824 | 2.446392 | 0.6 |
| −8.76384 | 2.48451 | 0.6 |
| −8.81766 | 2.552092 | 0.6 |
| −8.86961 | 2.674889 | 0.6 |
| −8.89099 | 2.859401 | 0.6 |
| −8.86507 | 3.10064 | 0.6 |
| −8.78436 | 3.392551 | 0.6 |
| −8.64472 | 3.730404 | 0.6 |
| −8.44229 | 4.109561 | 0.6 |
| −8.17351 | 4.524908 | 0.6 |
| −7.83406 | 4.96969 | 0.6 |
| −7.42028 | 5.435973 | 0.6 |
| −6.9269 | 5.912175 | 0.6 |
| −6.34846 | 6.382881 | 0.6 |
| −5.68054 | 6.828478 | 0.6 |
| −4.92116 | 7.225035 | 0.6 |
| −4.07257 | 7.544302 | 0.6 |
| −3.14306 | 7.750638 | 0.6 |
| −2.15218 | 7.808516 | 0.6 |
| −1.1314 | 7.687831 | 0.6 |
| −0.1192 | 7.378743 | 0.6 |
| 0.84668 | 6.888898 | 0.6 |
| 1.743234 | 6.248841 | 0.6 |
| 2.56164 | 5.492864 | 0.6 |
| 3.302621 | 4.65228 | 0.6 |
| 3.971896 | 3.753254 | 0.6 |
| 4.577857 | 2.817454 | 0.6 |
| 5.130032 | 1.862836 | 0.6 |
| 5.634771 | 0.902687 | 0.6 |
| 6.097964 | −0.05162 | 0.6 |
| 6.5248 | −0.9903 | 0.6 |
| 6.920962 | −1.90429 | 0.6 |
| 7.289921 | −2.78626 | 0.6 |
| 7.633072 | −3.63035 | 0.6 |
| 7.952958 | −4.43077 | 0.6 |
| 8.25128 | −5.18265 | 0.6 |
| 8.52785 | −5.88242 | 0.6 |
| 8.783261 | −6.52683 | 0.6 |
| 9.016839 | −7.11378 | 0.6 |
| 9.228745 | −7.64154 | 0.6 |
| 9.418332 | −8.10947 | 0.6 |
| 9.58531 | −8.51761 | 0.6 |
| 9.729563 | −8.8668 | 0.6 |
| 9.85122 | −9.15872 | 0.6 |
| 9.950833 | −9.39588 | 0.6 |
| 10.02937 | −9.58164 | 0.6 |
| 10.06863 | −9.72708 | 0.6 |
| 10.03478 | −9.82661 | 0.6 |
| 9.989714 | −9.87534 | 0.6 |
| 9.945829 | −9.90123 | 0.6 |
| 9.901139 | −9.91477 | 0.6 |
| 9.840353 | −9.91661 | 0.6 |
| 9.749988 | −9.88313 | 0.6 |
| 9.666611 | −9.77311 | 0.6 |
| 9.585092 | −9.60724 | 0.6 |
| 9.481631 | −9.39543 | 0.6 |
| 9.355353 | −9.13457 | 0.6 |
| 9.205725 | −8.82234 | 0.6 |
| 9.032584 | −8.4572 | 0.6 |
| 8.836198 | −8.03828 | 0.6 |
| 8.617022 | −7.56543 | 0.6 |
| 8.375443 | −7.03934 | 0.6 |
| 8.112706 | −6.46098 | 0.6 |
| 7.82852 | −5.83272 | 0.6 |
| 7.523912 | −5.15693 | 0.6 |
| 7.198938 | −4.43695 | 0.6 |
| 6.853318 | −3.67683 | 0.6 |
| 6.48597 | −2.88145 | 0.6 |
| 6.096281 | −2.05593 | 0.6 |
| 5.681937 | −1.20665 | 0.6 |
| 5.240117 | −0.34075 | 0.6 |
| 4.76775 | 0.533898 | 0.6 |
| 4.260312 | 1.407868 | 0.6 |
| 3.711827 | 2.269804 | 0.6 |
| 3.118199 | 3.107993 | 0.6 |
| 2.47276 | 3.906748 | 0.6 |
| 1.767324 | 4.645013 | 0.6 |
| 0.996793 | 5.29742 | 0.6 |
| 0.161694 | 5.833622 | 0.6 |
| −0.72609 | 6.223327 | 0.6 |
| −1.64123 | 6.443605 | 0.6 |
| −2.54812 | 6.495157 | 0.6 |
| −3.41382 | 6.392754 | 0.6 |
| −4.21263 | 6.165353 | 0.6 |
| −4.93068 | 5.847566 | 0.6 |
| −5.56326 | 5.471553 | 0.6 |
| −6.11188 | 5.064054 | 0.6 |
| −6.58154 | 4.646587 | 0.6 |
| −6.97948 | 4.236691 | 0.6 |
| −7.31325 | 3.847467 | 0.6 |
| −7.59131 | 3.489377 | 0.6 |
| −7.82353 | 3.171236 | 0.6 |
| −8.0181 | 2.898515 | 0.6 |
| −8.18538 | 2.677036 | 0.6 |
| −8.33491 | 2.512506 | 0.6 |
| −8.47493 | 2.415719 | 0.6 |
| −8.59555 | 2.395993 | 0.6 |
| −8.57679 | 4.053251 | 0.7 |
| −8.62007 | 4.093499 | 0.7 |
| −8.66903 | 4.164064 | 0.7 |
| −8.71085 | 4.28987 | 0.7 |
| −8.71639 | 4.474497 | 0.7 |
| −8.66928 | 4.711078 | 0.7 |
| −8.56304 | 4.99286 | 0.7 |

TABLE 1-continued

| X | Y | Zadim |
|---|---|---|
| −8.39326 | 5.314266 | 0.7 |
| −8.15631 | 5.669918 | 0.7 |
| −7.84828 | 6.053435 | 0.7 |
| −7.46519 | 6.45683 | 0.7 |
| −7.00219 | 6.868947 | 0.7 |
| −6.45515 | 7.275874 | 0.7 |
| −5.82143 | 7.660852 | 0.7 |
| −5.10009 | 8.00297 | 0.7 |
| −4.29394 | 8.278143 | 0.7 |
| −3.41086 | 8.458909 | 0.7 |
| −2.46572 | 8.512336 | 0.7 |
| −1.48397 | 8.40983 | 0.7 |
| −0.49922 | 8.134615 | 0.7 |
| 0.452826 | 7.685985 | 0.7 |
| 1.344399 | 7.082196 | 0.7 |
| 2.161467 | 6.352811 | 0.7 |
| 2.901396 | 5.528426 | 0.7 |
| 3.567899 | 4.635631 | 0.7 |
| 4.167684 | 3.696423 | 0.7 |
| 4.70945 | 2.729347 | 0.7 |
| 5.202101 | 1.74975 | 0.7 |
| 5.652623 | 0.769824 | 0.7 |
| 6.064999 | −0.20094 | 0.7 |
| 6.444833 | −1.15327 | 0.7 |
| 6.797419 | −2.07885 | 0.7 |
| 7.125643 | −2.97097 | 0.7 |
| 7.430905 | −3.82396 | 0.7 |
| 7.715516 | −4.63238 | 0.7 |
| 7.980978 | −5.39159 | 0.7 |
| 8.227217 | −6.09805 | 0.7 |
| 8.454729 | −6.74865 | 0.7 |
| 8.662981 | −7.34123 | 0.7 |
| 8.851992 | −7.87418 | 0.7 |
| 9.021165 | −8.34681 | 0.7 |
| 9.170205 | −8.75915 | 0.7 |
| 9.298989 | −9.11204 | 0.7 |
| 9.407624 | −9.40714 | 0.7 |
| 9.496583 | −9.64693 | 0.7 |
| 9.56672 | −9.83479 | 0.7 |
| 9.598437 | −9.98118 | 0.7 |
| 9.559491 | −10.0782 | 0.7 |
| 9.512398 | −10.1244 | 0.7 |
| 9.467648 | −10.1482 | 0.7 |
| 9.422532 | −10.1597 | 0.7 |
| 9.361876 | −10.1591 | 0.7 |
| 9.273005 | −10.1225 | 0.7 |
| 9.194004 | −10.0097 | 0.7 |
| 9.120238 | −9.84075 | 0.7 |
| 9.026605 | −9.62508 | 0.7 |
| 8.912258 | −9.35957 | 0.7 |
| 8.776694 | −9.04194 | 0.7 |
| 8.619735 | −8.67068 | 0.7 |
| 8.441594 | −8.24495 | 0.7 |
| 8.242701 | −7.76466 | 0.7 |
| 8.023453 | −7.23047 | 0.7 |
| 7.784963 | −6.64345 | 0.7 |
| 7.526988 | −6.00587 | 0.7 |
| 7.250226 | −5.32024 | 0.7 |
| 6.954958 | −4.58975 | 0.7 |
| 6.641094 | −3.81827 | 0.7 |
| 6.307671 | −3.0105 | 0.7 |
| 5.954566 | −2.1712 | 0.7 |
| 5.578984 | −1.3067 | 0.7 |
| 5.178608 | −0.4236 | 0.7 |
| 4.752107 | 0.471492 | 0.7 |
| 4.294538 | 1.369693 | 0.7 |
| 3.799544 | 2.260451 | 0.7 |
| 3.263946 | 3.133769 | 0.7 |
| 2.681671 | 3.976407 | 0.7 |
| 2.044816 | 4.771076 | 0.7 |
| 1.346726 | 5.496684 | 0.7 |
| 0.584743 | 6.128576 | 0.7 |
| −0.2371 | 6.639162 | 0.7 |
| −1.10362 | 7.003462 | 0.7 |
| −1.98774 | 7.207957 | 0.7 |
| −2.8565 | 7.258788 | 0.7 |
| −3.68101 | 7.175662 | 0.7 |
| −4.44079 | 6.986052 | 0.7 |
| −5.12512 | 6.720761 | 0.7 |
| −5.72955 | 6.405592 | 0.7 |
| −6.25312 | 6.06102 | 0.7 |
| −6.69916 | 5.70639 | 0.7 |
| −7.07379 | 5.358233 | 0.7 |
| −7.38502 | 5.030158 | 0.7 |
| −7.64297 | 4.733825 | 0.7 |
| −7.85659 | 4.476861 | 0.7 |
| −8.03655 | 4.266488 | 0.7 |
| −8.1931 | 4.109404 | 0.7 |
| −8.3356 | 4.017065 | 0.7 |
| −8.45617 | 3.999242 | 0.7 |
| −8.94769 | 4.728646 | 0.8 |
| −8.99286 | 4.76626 | 0.8 |
| −9.04417 | 4.834532 | 0.8 |
| −9.08824 | 4.958831 | 0.8 |
| −9.09579 | 5.142376 | 0.8 |
| −9.05104 | 5.378066 | 0.8 |
| −8.94736 | 5.659059 | 0.8 |
| −8.77972 | 5.979352 | 0.8 |
| −8.54347 | 6.332676 | 0.8 |
| −8.2338 | 6.711419 | 0.8 |
| −7.84575 | 7.105806 | 0.8 |
| −7.37471 | 7.503492 | 0.8 |
| −6.81697 | 7.88913 | 0.8 |
| −6.17044 | 8.243896 | 0.8 |
| −5.4362 | 8.546146 | 0.8 |
| −4.61893 | 8.7693 | 0.8 |
| −3.73026 | 8.886991 | 0.8 |
| −2.78879 | 8.874478 | 0.8 |
| −1.82042 | 8.713038 | 0.8 |
| −0.85508 | 8.393316 | 0.8 |
| 0.07882 | 7.920663 | 0.8 |
| 0.960913 | 7.313458 | 0.8 |
| 1.781549 | 6.597183 | 0.8 |
| 2.53933 | 5.797503 | 0.8 |
| 3.236909 | 4.936596 | 0.8 |
| 3.878782 | 4.033087 | 0.8 |
| 4.471482 | 3.103528 | 0.8 |
| 5.021674 | 2.161974 | 0.8 |
| 5.534056 | 1.219618 | 0.8 |
| 6.011156 | 0.285426 | 0.8 |
| 6.457327 | −0.63147 | 0.8 |
| 6.876182 | −1.52305 | 0.8 |
| 7.269059 | −2.38295 | 0.8 |
| 7.637043 | −3.20541 | 0.8 |
| 7.981929 | −3.98491 | 0.8 |
| 8.304173 | −4.71702 | 0.8 |
| 8.603314 | −5.39831 | 0.8 |
| 8.879382 | −6.02573 | 0.8 |
| 9.131725 | −6.59718 | 0.8 |
| 9.360082 | −7.11112 | 0.8 |
| 9.56396 | −7.56685 | 0.8 |
| 9.743077 | −7.96443 | 0.8 |
| 9.897433 | −8.30466 | 0.8 |
| 10.02733 | −8.58915 | 0.8 |
| 10.13346 | −8.82032 | 0.8 |
| 10.21699 | −9.00142 | 0.8 |
| 10.25809 | −9.1446 | 0.8 |
| 10.2257 | −9.24343 | 0.8 |
| 10.18221 | −9.29256 | 0.8 |
| 10.13954 | −9.31937 | 0.8 |
| 10.09555 | −9.33426 | 0.8 |
| 10.0352 | −9.33829 | 0.8 |
| 9.943927 | −9.30907 | 0.8 |
| 9.856308 | −9.20335 | 0.8 |
| 9.770806 | −9.04063 | 0.8 |
| 9.662084 | −8.83292 | 0.8 |
| 9.528926 | −8.57727 | 0.8 |
| 9.370548 | −8.2715 | 0.8 |
| 9.186536 | −7.91418 | 0.8 |
| 8.976891 | −7.50455 | 0.8 |
| 8.741878 | −7.04255 | 0.8 |
| 8.481883 | −6.52882 | 0.8 |
| 8.197931 | −5.96444 | 0.8 |
| 7.89017 | −5.35157 | 0.8 |
| 7.559793 | −4.69249 | 0.8 |
| 7.207137 | −3.99046 | 0.8 |

TABLE 1-continued

| X | Y | Zadim |
|---|---|---|
| 6.832468 | −3.24931 | 0.8 |
| 6.435773 | −2.47348 | 0.8 |
| 6.017579 | −1.6676 | 0.8 |
| 5.576434 | −0.83773 | 0.8 |
| 5.111044 | 0.009709 | 0.8 |
| 4.62125 | 0.8685 | 0.8 |
| 4.104074 | 1.730357 | 0.8 |
| 3.554925 | 2.585291 | 0.8 |
| 2.972074 | 3.424202 | 0.8 |
| 2.351842 | 4.23558 | 0.8 |
| 1.688535 | 5.004412 | 0.8 |
| 0.977174 | 5.712877 | 0.8 |
| 0.215843 | 6.341038 | 0.8 |
| −0.59315 | 6.866596 | 0.8 |
| −1.44002 | 7.268148 | 0.8 |
| −2.30571 | 7.531431 | 0.8 |
| −3.16459 | 7.655319 | 0.8 |
| −3.99092 | 7.650371 | 0.8 |
| −4.76307 | 7.534676 | 0.8 |
| −5.46576 | 7.330208 | 0.8 |
| −6.08956 | 7.060223 | 0.8 |
| −6.63112 | 6.748278 | 0.8 |
| −7.09108 | 6.414676 | 0.8 |
| −7.47391 | 6.077773 | 0.8 |
| −7.78742 | 5.753688 | 0.8 |
| −8.04243 | 5.456316 | 0.8 |
| −8.25021 | 5.195837 | 0.8 |
| −8.42238 | 4.980068 | 0.8 |
| −8.57053 | 4.815907 | 0.8 |
| −8.70567 | 4.713876 | 0.8 |
| −8.82362 | 4.684729 | 0.8 |
| −8.99812 | 6.195493 | 0.9 |
| −9.04165 | 6.234785 | 0.9 |
| −9.08864 | 6.305856 | 0.9 |
| −9.1222 | 6.433136 | 0.9 |
| −9.11261 | 6.616116 | 0.9 |
| −9.04531 | 6.845856 | 0.9 |
| −8.91448 | 7.11454 | 0.9 |
| −8.71502 | 7.415077 | 0.9 |
| −8.44227 | 7.739804 | 0.9 |
| −8.09154 | 8.079299 | 0.9 |
| −7.65854 | 8.421741 | 0.9 |
| −7.14001 | 8.752592 | 0.9 |
| −6.53438 | 9.054168 | 0.9 |
| −5.84285 | 9.30559 | 0.9 |
| −5.07095 | 9.483797 | 0.9 |
| −4.22971 | 9.565216 | 0.9 |
| −3.33579 | 9.529233 | 0.9 |
| −2.41168 | 9.360641 | 0.9 |
| −1.48195 | 9.052361 | 0.9 |
| −0.57067 | 8.606303 | 0.9 |
| 0.302454 | 8.033376 | 0.9 |
| 1.124953 | 7.351402 | 0.9 |
| 1.892058 | 6.58154 | 0.9 |
| 2.604431 | 5.744419 | 0.9 |
| 3.264856 | 4.857805 | 0.9 |
| 3.876731 | 3.936716 | 0.9 |
| 4.445641 | 2.995311 | 0.9 |
| 4.977039 | 2.045837 | 0.9 |
| 5.474466 | 1.09823 | 0.9 |
| 5.939805 | 0.160762 | 0.9 |
| 6.376809 | −0.758 | 0.9 |
| 6.78835 | −1.65054 | 0.9 |
| 7.175505 | −2.51069 | 0.9 |
| 7.538781 | −3.33303 | 0.9 |
| 7.879332 | −4.11233 | 0.9 |
| 8.197207 | −4.84439 | 0.9 |
| 8.492233 | −5.52565 | 0.9 |
| 8.764194 | −6.15317 | 0.9 |
| 9.012465 | −6.72487 | 0.9 |
| 9.236745 | −7.23922 | 0.9 |
| 9.436763 | −7.69544 | 0.9 |
| 9.612252 | −8.09356 | 0.9 |
| 9.763297 | −8.43435 | 0.9 |
| 9.890268 | −8.71939 | 0.9 |
| 9.99393 | −8.95104 | 0.9 |
| 10.07544 | −9.13257 | 0.9 |
| 10.11389 | −9.27613 | 0.9 |
| 10.08005 | −9.37426 | 0.9 |
| 10.03606 | −9.42275 | 0.9 |
| 9.993221 | −9.44905 | 0.9 |
| 9.949075 | −9.46354 | 0.9 |
| 9.888665 | −9.46706 | 0.9 |
| 9.797606 | −9.43704 | 0.9 |
| 9.710632 | −9.3307 | 0.9 |
| 9.627267 | −9.16678 | 0.9 |
| 9.521093 | −8.95764 | 0.9 |
| 9.39078 | −8.70038 | 0.9 |
| 9.235401 | −8.3929 | 0.9 |
| 9.054392 | −8.03385 | 0.9 |
| 8.847567 | −7.62256 | 0.9 |
| 8.615025 | −7.15904 | 0.9 |
| 8.35687 | −6.6441 | 0.9 |
| 8.07395 | −6.07888 | 0.9 |
| 7.766586 | −5.46546 | 0.9 |
| 7.435651 | −4.80628 | 0.9 |
| 7.081713 | −4.1045 | 0.9 |
| 6.705843 | −3.36354 | 0.9 |
| 6.307909 | −2.5879 | 0.9 |
| 5.888856 | −1.78201 | 0.9 |
| 5.448209 | −0.95139 | 0.9 |
| 4.984969 | −0.10227 | 0.9 |
| 4.49953 | 0.759503 | 0.9 |
| 3.990093 | 1.626485 | 0.9 |
| 3.453324 | 2.489787 | 0.9 |
| 2.888311 | 3.34137 | 0.9 |
| 2.292513 | 4.171423 | 0.9 |
| 1.661526 | 4.967581 | 0.9 |
| 0.991112 | 5.715518 | 0.9 |
| 0.279623 | 6.400262 | 0.9 |
| −0.47264 | 7.004917 | 0.9 |
| −1.26123 | 7.5122 | 0.9 |
| −2.07532 | 7.908041 | 0.9 |
| −2.89814 | 8.18479 | 0.9 |
| −3.70982 | 8.341402 | 0.9 |
| −4.49003 | 8.383582 | 0.9 |
| −5.21963 | 8.32332 | 0.9 |
| −5.88369 | 8.177082 | 0.9 |
| −6.47192 | 7.965064 | 0.9 |
| −6.97928 | 7.708655 | 0.9 |
| −7.40613 | 7.429173 | 0.9 |
| −7.7576 | 7.146361 | 0.9 |
| −8.04291 | 6.877642 | 0.9 |
| −8.27334 | 6.636761 | 0.9 |
| −8.46158 | 6.434689 | 0.9 |
| −8.61893 | 6.279182 | 0.9 |
| −8.75678 | 6.180753 | 0.9 |
| −8.87455 | 6.150655 | 0.9 |
| −9.04998 | 7.680453 | 1 |
| −9.09175 | 7.721933 | 1 |
| −9.13368 | 7.796491 | 1 |
| −9.15486 | 7.92694 | 1 |
| −9.12529 | 8.108434 | 1 |
| −9.03195 | 8.329947 | 1 |
| −8.87001 | 8.582497 | 1 |
| −8.63472 | 8.857745 | 1 |
| −8.32175 | 9.146355 | 1 |
| −7.9272 | 9.43697 | 1 |
| −7.44852 | 9.716271 | 1 |
| −6.88453 | 9.967713 | 1 |
| −6.2366 | 10.17149 | 1 |
| −5.51041 | 10.30603 | 1 |
| −4.71637 | 10.34968 | 1 |
| −3.87013 | 10.28345 | 1 |
| −2.99254 | 10.09326 | 1 |
| −2.10565 | 9.772919 | 1 |
| −1.2302 | 9.325253 | 1 |
| −0.38236 | 8.76088 | 1 |
| 0.427066 | 8.094615 | 1 |
| 1.192359 | 7.343066 | 1 |
| 1.911921 | 6.522947 | 1 |
| 2.587045 | 5.650083 | 1 |
| 3.220034 | 4.738429 | 1 |
| 3.812224 | 3.799468 | 1 |
| 4.367618 | 2.845069 | 1 |
| 4.890248 | 1.885914 | 1 |

TABLE 1-continued

| X | Y | Zadim |
|---|---|---|
| 5.382532 | 0.930936 | 1 |
| 5.845588 | −0.0122 | 1 |
| 6.282524 | −0.93538 | 1 |
| 6.69506 | −1.83167 | 1 |
| 7.083099 | −2.69545 | 1 |
| 7.44782 | −3.52097 | 1 |
| 7.789866 | −4.30323 | 1 |
| 8.108666 | −5.03827 | 1 |
| 8.404289 | −5.72242 | 1 |
| 8.67638 | −6.35279 | 1 |
| 8.924493 | −6.92721 | 1 |
| 9.148112 | −7.44422 | 1 |
| 9.347186 | −7.90296 | 1 |
| 9.521527 | −8.30344 | 1 |
| 9.671315 | −8.64637 | 1 |
| 9.79705 | −8.93328 | 1 |
| 9.899577 | −9.16652 | 1 |
| 9.980126 | −9.34932 | 1 |
| 10.01702 | −9.49388 | 1 |
| 9.982611 | −9.59226 | 1 |
| 9.938179 | −9.64067 | 1 |
| 9.895028 | −9.66685 | 1 |
| 9.850467 | −9.68118 | 1 |
| 9.789582 | −9.68426 | 1 |
| 9.69824 | −9.65281 | 1 |
| 9.611675 | −9.54485 | 1 |
| 9.529485 | −9.37881 | 1 |
| 9.424564 | −9.16709 | 1 |
| 9.295393 | −8.90685 | 1 |
| 9.14085 | −8.59609 | 1 |
| 8.960145 | −8.23354 | 1 |
| 8.752837 | −7.81866 | 1 |
| 8.518748 | −7.35161 | 1 |
| 8.25797 | −6.83319 | 1 |
| 7.97091 | −6.26479 | 1 |
| 7.658117 | −5.6484 | 1 |
| 7.320228 | −4.98659 | 1 |
| 6.95808 | −4.28243 | 1 |
| 6.572491 | −3.53951 | 1 |
| 6.164062 | −2.76202 | 1 |
| 5.734126 | −1.95422 | 1 |
| 5.283012 | −1.12128 | 1 |
| 4.810504 | −0.26905 | 1 |
| 4.317688 | 0.597005 | 1 |
| 3.803984 | 1.470154 | 1 |
| 3.267647 | 2.342613 | 1 |
| 2.708944 | 3.207414 | 1 |
| 2.126579 | 4.056181 | 1 |
| 1.517958 | 4.878987 | 1 |
| 0.880595 | 5.664935 | 1 |
| 0.214573 | 6.403908 | 1 |
| −0.48077 | 7.083556 | 1 |
| −1.20478 | 7.690283 | 1 |
| −1.95385 | 8.21039 | 1 |
| −2.72041 | 8.631342 | 1 |
| −3.49232 | 8.943821 | 1 |
| −4.25348 | 9.14378 | 1 |
| −4.98567 | 9.234174 | 1 |
| −5.67076 | 9.224566 | 1 |
| −6.29311 | 9.128612 | 1 |
| −6.84234 | 8.966229 | 1 |
| −7.31283 | 8.759228 | 1 |
| −7.70549 | 8.530323 | 1 |
| −8.02639 | 8.300241 | 1 |
| −8.28499 | 8.085974 | 1 |
| −8.49425 | 7.902616 | 1 |
| −8.66499 | 7.759374 | 1 |
| −8.80775 | 7.665962 | 1 |
| −8.92612 | 7.634484 | 1 |
| −8.94481 | 9.321767 | 1.1 |
| −8.98422 | 9.366422 | 1.1 |
| −9.01961 | 9.445445 | 1.1 |
| −9.02557 | 9.578971 | 1.1 |
| −8.97256 | 9.757325 | 1.1 |
| −8.84914 | 9.966885 | 1.1 |
| −8.65205 | 10.19774 | 1.1 |
| −8.37731 | 10.4401 | 1.1 |
| −8.0214 | 10.6827 | 1.1 |
| −7.58199 | 10.91231 | 1.1 |
| −7.05905 | 11.11461 | 1.1 |
| −6.45438 | 11.27171 | 1.1 |
| −5.7733 | 11.3624 | 1.1 |
| −5.02594 | 11.36634 | 1.1 |
| −4.22773 | 11.26441 | 1.1 |
| −3.39808 | 11.04364 | 1.1 |
| −2.55812 | 10.69754 | 1.1 |
| −1.72827 | 10.22684 | 1.1 |
| −0.92364 | 9.641751 | 1.1 |
| −0.1519 | 8.958807 | 1.1 |
| 0.584661 | 8.195474 | 1.1 |
| 1.285986 | 7.367248 | 1.1 |
| 1.952366 | 6.487175 | 1.1 |
| 2.584742 | 5.567054 | 1.1 |
| 3.184894 | 4.617971 | 1.1 |
| 3.751622 | 3.648274 | 1.1 |
| 4.286986 | 2.667683 | 1.1 |
| 4.793763 | 1.685592 | 1.1 |
| 5.273558 | 0.710192 | 1.1 |
| 5.726689 | −0.25142 | 1.1 |
| 6.155735 | −1.19149 | 1.1 |
| 6.561293 | −2.10366 | 1.1 |
| 6.941494 | −2.98305 | 1.1 |
| 7.299186 | −3.82318 | 1.1 |
| 7.635009 | −4.61903 | 1.1 |
| 7.947492 | −5.36698 | 1.1 |
| 8.236867 | −6.06329 | 1.1 |
| 8.50273 | −6.70505 | 1.1 |
| 8.744628 | −7.29007 | 1.1 |
| 8.961965 | −7.81692 | 1.1 |
| 9.155047 | −8.28457 | 1.1 |
| 9.323797 | −8.69299 | 1.1 |
| 9.468496 | −9.04286 | 1.1 |
| 9.589767 | −9.33567 | 1.1 |
| 9.688521 | −9.57378 | 1.1 |
| 9.766046 | −9.76043 | 1.1 |
| 9.800283 | −9.90747 | 1.1 |
| 9.76451 | −10.0065 | 1.1 |
| 9.718713 | −10.0548 | 1.1 |
| 9.674556 | −10.0804 | 1.1 |
| 9.628956 | −10.094 | 1.1 |
| 9.567005 | −10.0955 | 1.1 |
| 9.475341 | −10.0601 | 1.1 |
| 9.390969 | −9.94773 | 1.1 |
| 9.311728 | −9.77687 | 1.1 |
| 9.210283 | −9.55915 | 1.1 |
| 9.084927 | −9.29175 | 1.1 |
| 8.934324 | −8.9727 | 1.1 |
| 8.757452 | −8.60084 | 1.1 |
| 8.553567 | −8.17575 | 1.1 |
| 8.322141 | −7.69776 | 1.1 |
| 8.062885 | −7.16788 | 1.1 |
| 7.776106 | −6.58757 | 1.1 |
| 7.462716 | −5.9587 | 1.1 |
| 7.12342 | −5.28383 | 1.1 |
| 6.758957 | −4.56616 | 1.1 |
| 6.369033 | −3.8099 | 1.1 |
| 5.955545 | −3.01868 | 1.1 |
| 5.520102 | −2.19668 | 1.1 |
| 5.06358 | −1.34887 | 1.1 |
| 4.586823 | −0.48059 | 1.1 |
| 4.091609 | 0.403024 | 1.1 |
| 3.578372 | 1.295817 | 1.1 |
| 3.047052 | 2.191083 | 1.1 |
| 2.499207 | 3.082841 | 1.1 |
| 1.934544 | 3.963775 | 1.1 |
| 1.352383 | 4.826015 | 1.1 |
| 0.752732 | 5.661797 | 1.1 |
| 0.138355 | 6.46507 | 1.1 |
| −0.49194 | 7.226489 | 1.1 |
| −1.14013 | 7.935036 | 1.1 |
| −1.80891 | 8.577085 | 1.1 |
| −2.49969 | 9.136781 | 1.1 |
| −3.20847 | 9.599734 | 1.1 |
| −3.92515 | 9.95518 | 1.1 |
| −4.63394 | 10.19961 | 1.1 |
| −5.31687 | 10.33564 | 1.1 |

TABLE 1-continued

| X | Y | Zadim |
|---|---|---|
| −5.9565 | 10.36823 | 1.1 |
| −6.53606 | 10.31515 | 1.1 |
| −7.04479 | 10.19595 | 1.1 |
| −7.47783 | 10.03491 | 1.1 |
| −7.83663 | 9.85492 | 1.1 |
| −8.12732 | 9.675877 | 1.1 |
| −8.36152 | 9.517324 | 1.1 |
| −8.54937 | 9.390676 | 1.1 |
| −8.6998 | 9.304629 | 1.1 |
| −8.82029 | 9.272754 | 1.1 |
| −9.95394 | 9.900341 | 1.2 |
| −9.99629 | 9.943818 | 1.2 |
| −10.0343 | 10.02346 | 1.2 |
| −10.0405 | 10.15945 | 1.2 |
| −9.98499 | 10.3408 | 1.2 |
| −9.85643 | 10.55267 | 1.2 |
| −9.65196 | 10.78473 | 1.2 |
| −9.36734 | 11.02628 | 1.2 |
| −8.99885 | 11.26469 | 1.2 |
| −8.54441 | 11.48533 | 1.2 |
| −8.00492 | 11.67329 | 1.2 |
| −7.383 | 11.8099 | 1.2 |
| −6.68581 | 11.87277 | 1.2 |
| −5.92512 | 11.84198 | 1.2 |
| −5.11752 | 11.70082 | 1.2 |
| −4.28295 | 11.43836 | 1.2 |
| −3.44194 | 11.0512 | 1.2 |
| −2.61291 | 10.54312 | 1.2 |
| −1.80705 | 9.927814 | 1.2 |
| −1.02795 | 9.223632 | 1.2 |
| −0.27172 | 8.451331 | 1.2 |
| 0.465927 | 7.627442 | 1.2 |
| 1.184864 | 6.762352 | 1.2 |
| 1.884946 | 5.865629 | 1.2 |
| 2.565899 | 4.946119 | 1.2 |
| 3.223327 | 4.009332 | 1.2 |
| 3.855538 | 3.062619 | 1.2 |
| 4.463043 | 2.114458 | 1.2 |
| 5.045848 | 1.172558 | 1.2 |
| 5.602568 | 0.243401 | 1.2 |
| 6.134155 | −0.6655 | 1.2 |
| 6.639098 | −1.5485 | 1.2 |
| 7.116143 | −2.40021 | 1.2 |
| 7.565727 | −3.21479 | 1.2 |
| 7.988708 | −3.98667 | 1.2 |
| 8.38269 | −4.71263 | 1.2 |
| 8.747488 | −5.38883 | 1.2 |
| 9.082406 | −6.0124 | 1.2 |
| 9.386743 | −6.58115 | 1.2 |
| 9.65962 | −7.09377 | 1.2 |
| 9.901577 | −7.549 | 1.2 |
| 10.11266 | −7.94674 | 1.2 |
| 10.29334 | −8.28761 | 1.2 |
| 10.4445 | −8.57298 | 1.2 |
| 10.56743 | −8.8051 | 1.2 |
| 10.66383 | −8.98709 | 1.2 |
| 10.7133 | −9.1328 | 1.2 |
| 10.68846 | −9.23685 | 1.2 |
| 10.64695 | −9.29058 | 1.2 |
| 10.60469 | −9.32093 | 1.2 |
| 10.55945 | −9.33908 | 1.2 |
| 10.49632 | −9.34611 | 1.2 |
| 10.39995 | −9.31641 | 1.2 |
| 10.30514 | −9.20836 | 1.2 |
| 10.20859 | −9.04125 | 1.2 |
| 10.0848 | −8.8285 | 1.2 |
| 9.931515 | −8.56754 | 1.2 |
| 9.746988 | −8.25663 | 1.2 |
| 9.529808 | −7.89483 | 1.2 |
| 9.278881 | −7.48196 | 1.2 |
| 8.993361 | −7.01865 | 1.2 |
| 8.672713 | −6.50618 | 1.2 |
| 8.317417 | −5.94603 | 1.2 |
| 7.928928 | −5.33978 | 1.2 |
| 7.508314 | −4.68996 | 1.2 |
| 7.055714 | −4.00037 | 1.2 |
| 6.572317 | −3.2747 | 1.2 |
| 6.060189 | −2.5166 | 1.2 |
| 5.52183 | −1.72992 | 1.2 |
| 4.959467 | −0.91909 | 1.2 |
| 4.375595 | −0.08872 | 1.2 |
| 3.773186 | 0.756604 | 1.2 |
| 3.154375 | 1.611446 | 1.2 |
| 2.521699 | 2.470446 | 1.2 |
| 1.878409 | 3.328632 | 1.2 |
| 1.225957 | 4.179576 | 1.2 |
| 0.567606 | 5.018155 | 1.2 |
| −0.09262 | 5.839903 | 1.2 |
| −0.74971 | 6.641301 | 1.2 |
| −1.40479 | 7.413898 | 1.2 |
| −2.06176 | 8.146559 | 1.2 |
| −2.72753 | 8.824352 | 1.2 |
| −3.41056 | 9.427567 | 1.2 |
| −4.11142 | 9.939286 | 1.2 |
| −4.82305 | 10.34681 | 1.2 |
| −5.53193 | 10.64379 | 1.2 |
| −6.22141 | 10.8278 | 1.2 |
| −6.87293 | 10.90399 | 1.2 |
| −7.46902 | 10.88578 | 1.2 |
| −7.99623 | 10.79268 | 1.2 |
| −8.44706 | 10.64825 | 1.2 |
| −8.82098 | 10.47678 | 1.2 |
| −9.12256 | 10.29937 | 1.2 |
| −9.36365 | 10.13849 | 1.2 |
| −9.55453 | 10.00633 | 1.2 |
| −9.70352 | 9.910029 | 1.2 |
| −9.82261 | 9.863229 | 1.2 |
| −9.90457 | 9.872035 | 1.2 |

In the above table, the plane Zadim=0 corresponds to the reference plane P0 situated at the base of the profile. This plane P0 is the intersection of the stacking axis AE of the set of blades with the axisym metric surface of the hub, i.e. it passes via the intersection between the axis AE and the surface where it is assembled with the platform 14. The plane Zadim=1 corresponds to the reference plane P1 situated at the top of the profile. This plane P1 is the intersection between the axis AE and the axisym metric surface of the casing, i.e. it passes via the intersection of the axis AE with the surface where it is assembled with the top platform 10.

By convention, the stacking axis AE of a blade of a rotary wheel, is an axis that extends in the radial direction Z and is an axis on which the various X, Y sections of the set of blades are "stacked" when designing the set of blades.

As mentioned at the beginning of the present description, the aerodynamic profile of the disclosure is substantially identical to the nominal profile defined in the above table, i.e. it departs from said nominal profile by very little at most, being defined in particular within an envelope of ±1 mm in a direction normal to the surface of the nominal profile, and/or having X, Y coordinates lying within a range of ±5% relative to the coordinates X, Y of the nominal profile. Also, the aerodynamic profile is positioned rotated within ±10°, particularly within ±5°, more particularly within ±3°, with respect to the stacking axis of the blade. In other words, the stagger angle may vary by ±10°, particularly by ±5°, more particularly by ±3°.

The coordinates of the above table are given starting from a value Zadim=0 in the reference plane P0. The coordinate Zadim is non-dimensional, i.e. for a point P, situated at a distance D from the plane P0 (where D is measured along the axis Z), the value of Zadim is D/H, where H represents the total height of the profile as measured between the planes P0 and P1. Naturally, in the table above, by multiplying the coordinate Zadim by the height H, it is possible to obtain the complete coordinates of the blade.

Preferably, the height H of the profile of the blade lies in the range 126 mm ±10%. By way of example, the reference plane P0 is at a distance of about 438 mm ±10% from the axis A of the turbine.

In the above table, the profile is characterized by fifteen section planes at constant Zadim coordinates, for which the coordinates X and Y are specified. These fifteen section planes include eleven section planes located between Zadim=0 and Zadim=1, and thus arranged in the fluid stream, these section planes being distributed on the vane's height from P0 to P1. The fifteen section planes also include four section planes which are substantially outside the fluid stream (two section planes with Zadim<0, and two section planes with Zadim>1), these four section planes being provided for ensuring geometric continuity of the stacking, close to the head and the foot, respectively. In each section plane at constant coordinate Zadim, the section of the profile is given by a continuous and smooth curve, interconnecting all of the points (X, Y). In each section plane, the profile is interpolated so as to generate a uniform profile.

It is advantageous for the rotary wheel that includes the blade of the disclosure to have 163 to 183 blades, in particular 173 blades, that present aerodynamic profiles as defined above.

We claim:

1. An aerodynamic profile for a turbine blade, the profile being, when cold and in a non-coated state, substantially identical to a nominal profile determined by Cartesian coordinates X, Y, Zadim given in Table 1, in which the coordinate Zadim is a quotient D/H, where D is a distance of a point under consideration from a first reference X, Y plane situated at a base of the nominal profile, and H is a height of said nominal profile measured from said first reference plane that is an intersection of a stacking axis of the blade and an axisymmetric surface of a hub, out to a second reference plane that is an intersection of said stacking axis with an axisymmetric surface of a casing, the measurements D and H being taken radially relative to an axial direction of a turbine, while the coordinate X is measured in the axial direction of the turbine.

2. The aerodynamic profile as claimed in claim 1, wherein the blade is a blade of a rotary wheel forming a portion of a rotor of a turbine.

3. A turbine blade, presenting the aerodynamic profile as claimed in claim 1.

4. A turbine, including turbine blades each presenting the aerodynamic profile as claimed in claim 1.

5. A turbine as claimed in claim 4, including a rotary wheel, having 163 to 183 blades that each presents the aerodynamic profile.

6. A turbine as claimed in claim 4, including a rotary wheel, having 163 blades that each presents the aerodynamic profile.

7. A rotary wheel of a turbine forming a portion of a turbine rotor, wherein all blades of the rotary wheel present the aerodynamic profile as claimed in claim 1.

8. The rotary wheel of a turbine as claimed in claim 7, including 163 to 183 blades that each presents the aerodynamic profile.

9. The rotary wheel of a turbine as claimed in claim 7, including 173 blades that each presents the aerodynamic profile.

10. An aerodynamic profile for a turbine blade, the profile being, when cold and in a non-coated state, substantially identical to a nominal profile determined by Cartesian coordinates X, Y, Zadim given in Table 1, in which the coordinate Zadim is a quotient D/H, where D is a distance of a point under consideration from a first reference X,Y plane situated at a base of the nominal profile, and H is a height of said nominal profile measured from said first reference plane that is an intersection of a stacking axis of the blade and an axisymmetric surface of a hub, out to a second reference plane that is an intersection of said stacking axis with an axisymmetric surface of a casing, the measurements D and H being taken radially relative to an axial direction of a turbine, while the coordinate X is measured in the axial direction of the turbine, wherein the aerodynamic profile is positioned within ±10° with respect to the stacking axis of the blade.

11. The aerodynamic profile as claimed in claim 10, wherein the aerodynamic profile is positioned within ±5° with respect to the stacking axis of the blade.

12. The aerodynamic profile as claimed in claim 10, wherein the aerodynamic profile is positioned within ±3° with respect to the stacking axis of the blade.

13. An aerodynamic profile for a turbine blade, the profile being, when cold and in a non-coated state, substantially identical to a nominal profile determined by Cartesian coordinates X, Y, Zadim given in Table 1, in which the coordinate Zadim is a quotient D/H, where D is a distance of a point under consideration from a first reference X, Y plane situated at a base of the nominal profile, and H is a height of said nominal profile measured from said first reference plane that is an intersection of a stacking axis of the blade and an axisymmetric surface of a hub, out to a second reference plane that is an intersection of said stacking axis with an axisymmetric surface of a casing, the measurements D and H being taken radially relative to an axial direction of a turbine, while the coordinate X is measured in the axial direction of the turbine, wherein:
(1) said aerodynamic profile is defined within an envelope of ±1mm in a direction normal to a surface of the nominal profile, (2) the coordinates X, Y of said aerodynamic profile lie within a range of ±5% relative to the coordinates X, Y of the nominal profile, or (3) the aerodynamic profile is positioned within ±1020 with respect to the stacking axis of the blade.

* * * * *